United States Patent [19]
Williams

[11] 3,741,252
[45] June 26, 1973

[54] PIPE PROTECTOR
[75] Inventor: Fred D. Williams, Long Beach, Calif.
[73] Assignee: Hydrill Company, Los Angeles, Calif.
[22] Filed: Sept. 14, 1971
[21] Appl. No.: 180,380

[52] U.S. Cl. .................................. 138/110, 308/4
[51] Int. Cl. ............................................. F16l 11/00
[58] Field of Search.................... 138/110, 151, 156, 138/158, 167, 140, 141, 143, 178; 308/4 A

[56] References Cited
UNITED STATES PATENTS
2,197,531   4/1940   Smith................................ 308/4 A
2,959,453   11/1960  Jacobs.............................. 308/4 A
3,049,382   8/1962   Ell..................................... 308/4 A
3,449,022   6/1969   Minor................................ 308/4 A Primary Examiner—George E. Lowrance
Assistant Examiner—Steven M. Pollard
Attorney—White, Haefliger and Bachand

[57] ABSTRACT

A well pipe protector comprises:
a. a C-shaped body including a metallic core and a rigid plastic sheath attached to the core and extending outwardly therefrom,
b. non-metallic terminals in the body to be drawn together in interfitting relation for retention after lateral application of the body about the pipe, and
c. elastomer insert means carried at the inner side of the body to be compressed between the body and pipe in response to said drawing together of the terminals.

9 Claims, 6 Drawing Figures

PATENTED JUN 26 1973 3,741,252

INVENTOR.
FRED D. WILLIAMS
BY
White, Haefliger & Bachand
ATTORNEYS.

PIPE PROTECTOR

BACKGROUND OF THE INVENTION

This invention relates generally to well pipe protection, and more particularly concerns improvements in well pipe protectors facilitating their use in corrosive fluid environments, such as salt water in wells.

Well pipe protectors have in the past embodied exposed metal construction, as for example steel terminals adapted to be drawn together and interconnected as the protector is coupled to the pipe, and metallic spring fingers engagable with the pipe at the inside of the protector. It is found that in corrosive fluid environments, the metal deteriorates rapidly, greatly limiting the useful lives of such protectors.

SUMMARY OF THE INVENTION

It is a major object of the invention to provide a solution to the above as well as other problems associated with the construction and use of pipe protectors, in corrosive fluid environments. Basically, the connection is embodied in a protector having a C-shaped body including a metallic core and a rigid plastic sheath attached to the core and extending outwardly therefrom; non-metallic terminals on the body to be drawn together in interfitting relation for retention after lateral application of the body about the pipe; and elastomeric insert means carried at the inner side of the body to be compressed between the body and pipe in response to such drawing together of the terminals.

As will be seen, the sheath may consist of thermoplastic material and forming flutes extending longitudinally; the body may be split between the terminals and locally weakened opposite the split to provide a hinge; the concealed core consists of spring steel having an untensioned position in which terminal teeth groups are spaced apart at opposite sides of the split, the core being resiliently expandible to pass well pipe through the split; the insert means may consist of a perforated rubber sleeve lining the inner side or face of the body; and the sleeve may form terminals overlapping or matching the terminals on the body, the latter being defined by both the sheath and the core with the core terminals sandwiched between the sheath and sleeve terminals. In this regard, the plastic sheath terminals may define longitudinally alignable openings to pass a fastener.

These and other objects and advantages of the invention, as well as the details of an illustrative embodiment, will be more fully understood from the following description and drawings, in which:

DRAWING DESCRIPTION

DETAILED DESCRIPTION

Figure 1:
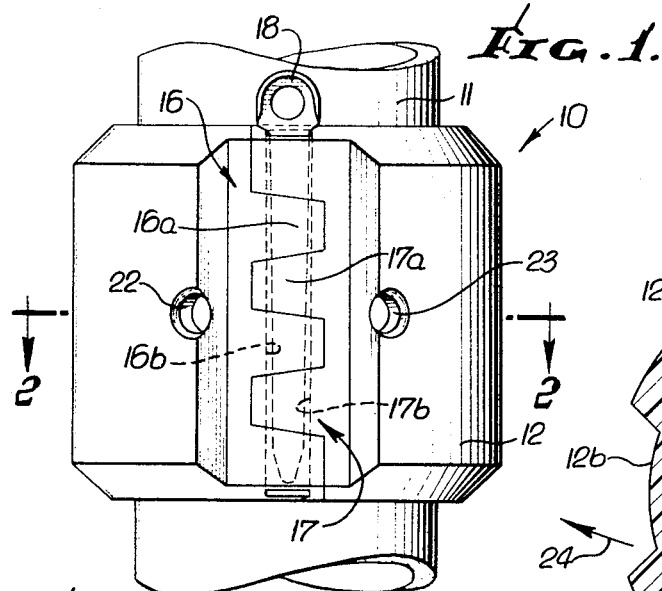
FIG. 1 is a side elevation of a pipe protector assembled on well pipe.
Figure 2:
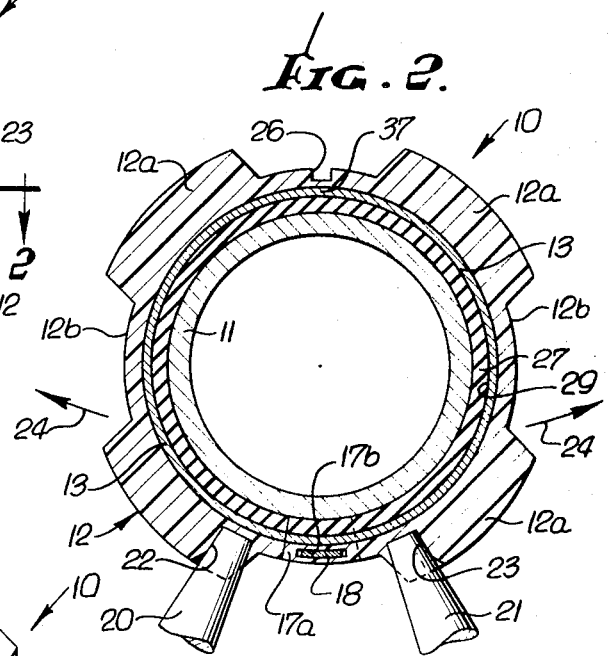
FIG. 2 is a section taken on line 2—2 of FIG. 1.
Figures 5A, 5B:
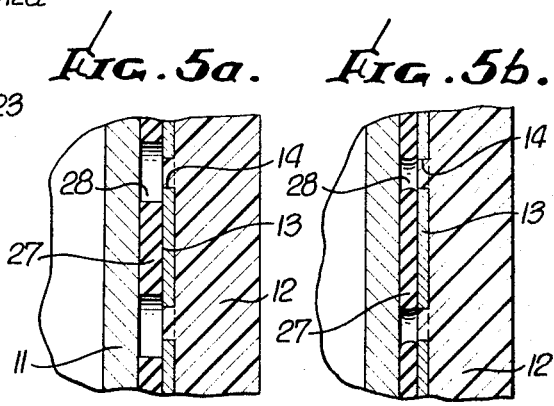
FIGS. 5a and 5b are enlarged fragmentary sections through the protector.

In FIGS. 1 and 2 the protector 10 applied for example to drill pipe 11, has a body including a non-metallic (as for example thermoplastic material, such as Dacron, or Du Pont LD-2649) split sleeve sheath having C-shape. Sheath 12 extends about a similarly shaped, thin metallic (as for example spring steel) core 13 which is joined to the sheath as for example by bonding. FIGS. 5a and 5b illustrate the provision of holes 14 in the thin core into which sheath plastic is molded for retaining the sheath to the core. Sheath 12 may be externally longitudinally ribbed at 12a for engagement with the well bore, and to provide flow passages 12b between the ribs for well fluid.

It will be seen that the body has terminals adapted to be drawn together in interfitting relation, for retention after lateral application of the body and core about the tube 11. In this regard, the terminals may, with unusual advantage be defined by first and second groups 16 and 17 of staggered teeth 16a and 17a formed by the non-metallic or plastic sheath 12. Such teeth have longitudinal openings 16b and 17b therein adapted to be brought into alignment to receive a corrosion resistant retainer pin 18 upon coupling the protector about the pipe. Such alignment may be affected by manipulation of tongs, the jaws 20 and 21 of which are receivable into openings 22 and 23 formed in body 12, partly in the ribs 12a closest the teeth 16 and 17, and partly in the body material adjacent the teeth.

Figure 3:
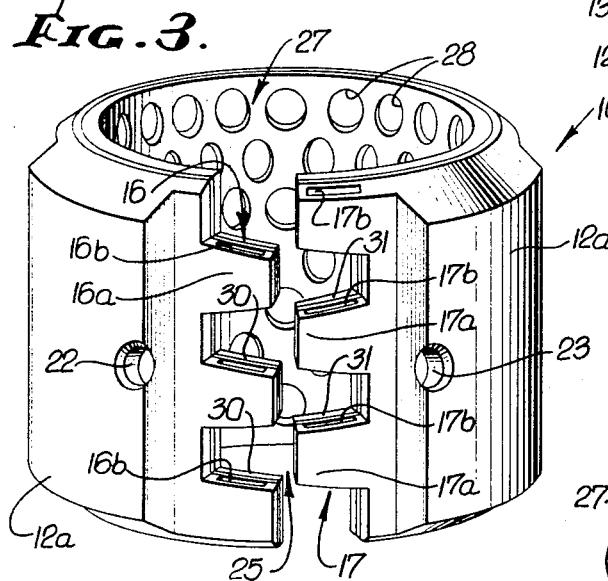
FIG. 3 is a perspective showing of the FIG. 1 protector prior to assembly about the pipe.

To facilitate application of the protector 10 about pipe 11, the core 13 is resiliently expandable in the direction of arrows 24 in FIG. 2, and from the untensioned positioned of FIG. 3 in which teeth 16 and 17 are out of alignment to provide a gap 25 there between. In other words, the gap or split 25 is widened to pass the pipe 11, this being facilitated by reducing the thickness of body 12 at longitudinally elongated location 26, the core then providing a hinge at 37.

In accordance with an important feature of the invention, elastomeric insert means is carried at the inner side of the body to be compressed between the body and pipe when the protector is coupled to the pipe with terminals 16 and 17 being drawn together and interconnected. As shown, the insert means may take the form of a rubber sleeve 27 which is perporated, as by through openings 28, and which lines the inner wall of the interconnected sheath and core, as by bonding to the core at 29. Accordingly, the latter is sandwiched between the sheath and insert, for protection against corrosion.

Coupling of the protector to the pipe squeezes the liner or sheet 27 from the condition seen in FIG. 5a to that seen in FIG. 5b, for example, with rubber being squeezed into the openings 28. Such coupling firmly attaches the protector to the pipe, there being no exposed metal grips required, so that corrosion in salt water environment is not a problem. In fact, the overall construction of the protector lends itself extremely well to use in such chemically adverse environments as salt water and briny drilling fluid, and also to high pressure gas exposure.

Figure 4:
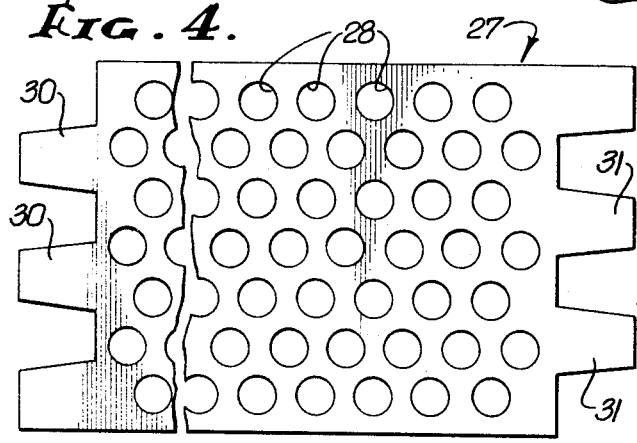
FIG. 4 is a fragmentary elevational view of an elastomer insert in straightened condition.

It will be further noted that positive coupling of the protector to the pipe as well as maximum protection to the metal core are promoted by forming the terminals of the core and insert coextensively with the staggered teeth 16 and 17. See for example the liner "teeth" at 30 and 31 in FIG. 4, and the FIG. 2 overlap of such "teeth."

I claim:

1. In a well pipe protector, a. a C-shaped body including a metallic core and a rigid plastic sheath attached to the core and extending thereabout, b. the body having non-metallic terminals to be drawn together in interfitting relation for retention after lateral application of the body about the pipe, said terminals defined by the rigid plastic sheath and defining longitudinally alignable openings to pass a fastener, said openings being everywhere outwardly spaced from the core, and c. elastomer insert means carried at the inner side of the body to be compressed between the body and pipe in response to said drawing together of the terminals.

2. The protector of claim 1 wherein the elastomer insert means compresses a perforated sleeve lining and bonded to the inner side of the body, the core containing multiple perforations, the sheath projecting into said perforations.

3. The protector of claim 1 wherein the body has a split between the terminals, and the sheath being locally weakened so that the adjacent core extent provides a hinge opposite the split.

4. The protector of claim 1 wherein the plastic sheath defines longitudinal external flutes.

5. The protector of claim 1 wherein the sheath consists of thermoplastic material.

6. The protector of claim 2 wherein the sleeve and core form terminals overlapping the sheath terminals at the inner sides thereof.

7. The protector of claim 1 wherein the terminals are defined by said plastic sheath as first and second groups of staggered teeth.

8. The protector of claim 7 wherein the core comprises spring steel having an untensioned position in which the teeth groups are spaced apart, the core being resiliently expandable to pass well pipe through the space between said tooth groups.

9. The protector of claim 8 wherein the plastic sheath has reduced thickness at the side thereof opposite said tooth groups thereby to provide a hinge.

* * * * *

UNITED STATES PATENT OFFICE
CERTIFICATE OF CORRECTION

Patent No. 3,741,252           Dated June 26, 1973

Inventor(s) Fred D. Williams

It is certified that error appears in the above-identified patent and that said Letters Patent are hereby corrected as shown below:

On summary page at [73] after Assignee: "Hydrill" should read --Hydril--

Column 3, line 16; "sert means compresses a perforated sleeve lining and" should read --sert means comprises a perforated sleeve lining and--

Signed and sealed this 19th day of November 1974.

(SEAL)
Attest:

McCOY M. GIBSON JR.           C. MARSHALL DANN
Attesting Officer           Commissioner of Patents